United States Patent Office 3,515,238
Patented June 2, 1970

3,515,238
RETRACTABLE CUSHION CELLS FOR FLUID CUSHION VEHICLES
William H. Knuth, Sacramento, and William F. Shiflet, Rancho Cordova, Calif., assignors to Aerojet-General Corporation, El Monte, Calif., a corporation of Ohio
Filed Apr. 30, 1968, Ser. No. 725,371
Int. Cl. B60v 1/16
U.S. Cl. 180—121         11 Claims

ABSTRACT OF THE DISCLOSURE

This disclosure relates to retractable cushion cells for fluid cushion vehicles.

According to the present disclosure, a cushion cell is provided which depends from the vehicle and forms a cell, such as an air cell. The cushion cell is connected to retraction means for selectively extending and retracting the cell.

---

This invention relates to fluid cushion vehicles, and particularly to air cushion vehicles having flexible retractable cushions.

Air cushion vehicles include a plurality of discrete cushion cells adapted to lift the vehicle above the ground level. Heretofore, the ability of air cushion vehicles to maneuver, particularly at relatively high velocities, has been impaired due to the inability of the vehicle to pitch and roll.

It is an object of the present invention to provide cushion cells which are capable of being selectively retracted and extended to stabilize the vehicle while maneuvering at relatively high velocities.

Another object of the present invention is to provide retractable cushion cells for fluid cushion vehicles adapted to retract and extend to bank and pitch the vehicle while it is maneuvering.

Another object of the present invention is to provide a control system for retracting the extending retractable cushion cells for fluid cushion vehicles.

According to the present invention, a retractable cushion cell for a fluid cushion vehicle is provided which depends from the vehicle and forms a fluid cell. Retraction means is mounted to the vehicle for selectively extending and retracting the flexible cell.

According to an optional and desirable feature of the present invention, a control system is provided for selectively operating the retraction mechanism.

The above and other features of this invention will be more fully understood from the following detailed description and the accompanying drawings, in which.

Figure 1:
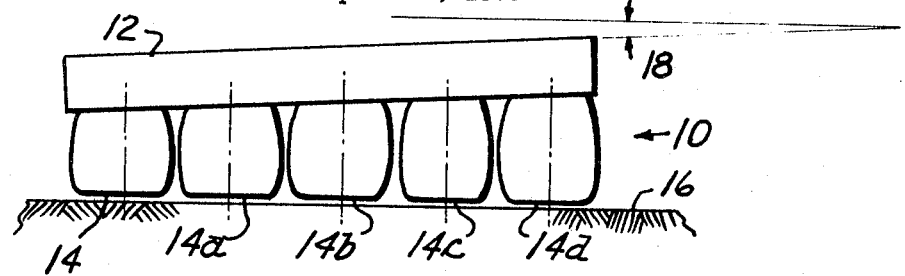
FIG. 1 is a side view elevation of a fluid cushion vehicle according to the presently preferred embodiment of the present invention.

In the drawings there is illustrated a vehicle 10 according to the presently preferred embodiment of the present invention, having a substantially rigid housing 12 and a plurality of cushion cells 14, 14a, etc. and 15, 15a, etc., depending downwardly from the housing. Cushion cells 14, 14a, etc. depend from the right or starboard side of the vehicle while cushion cells 15, 15a, etc. depend from the left or port side of the vehicle. The several cushion cells may be identical in construction. As illustrated in FIG. 1, cushion cell 14 is more retracted than cushion cell 14d which is fully extended. Each of the cushion cells provides a fluid cushion to support housing 12 from ground 16 by a distance dependent upon the length of extension of each cushion cell. Since the cushion cells are extended at different lengths, housing 12 is disposed at pitch angle 18 from the horizon.

Figure 2:
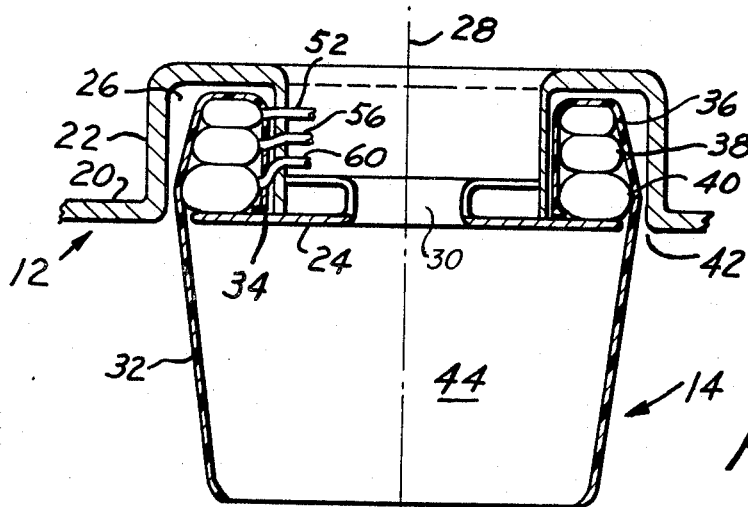
FIG. 2 is a view in cutaway cross-section of a cushion cell for use in the vehicle illustrated in FIG. 1.

As illustrated in FIG. 2, wall 20 of housing 12 includes recessed portion 22. Plate 24 closes a portion of the opening to recessed portion 22 to form chamber 26. Recessed portion 22 preferably is disposed about axis 28 of cushion cell 14 so that chamber 26 is substantially cylindrical in shape. Plate 24 forms orifice 30 to provide fluid communication between a source of fluid under pressure (not shown), such as air, and chamber 44.

Cushion cell 14 comprises skirt 32 constructed of suitable flexible material fixed to plate 24 within chamber 26 by suitable attachment means, such as an adhesive bonding agent 34. Skirt 32 is preferably constructed of a sealed fabric such as neoprene-coated dacron or neoprene-coated nylon. One or more pneumatic bladders 36, 38, 40 is supported on plate 24 within chamber 26, and skirt 32 is wrapped over the upper and outer portions of the bladders and depends from housing 12 through opening 42 provided between plate 34 and wall 20. Bladders 36, 38 and 40 may be constructed of any suitable inflatable material such as neoprene-coated dacron, neoprene-coated nylon, or butyl rubber. Although three toroidal bladders are ilustrated in the drawings, it is to be understood that the number of such bladders may vary in accordance with the particular application.

As shown particularly in FIG. 2, it is preferred that skirt 32 be tapered so that upon inflation with pressurized fluid the skirt will inflate to the shape illustrated in FIG. 1.

A suitable pump mechanism (not shown) may be mounted within housing 12 and is adapted to supply pressurized fluid, such as air under pressure, to each orifice 30 of each cushion cell. The pressurized fluid enters each chamber 44 forced by the depending portion of skirt 32 and inflates the skirt to form an air cell. The pressurized fluid reacts against the ground adjacent opening 46 of each chamber to lift against plate 24, thereby lifting housing 12. Preferably, the pressurized fluid is uniformly delivered to each chamber 44 so that the pressurized fluid uniformly lifts the vehicle. The amount of lifting force is dependent upon the pressure of the fluid within the cell and the distance between the ground and opening 46.

Figure 3:
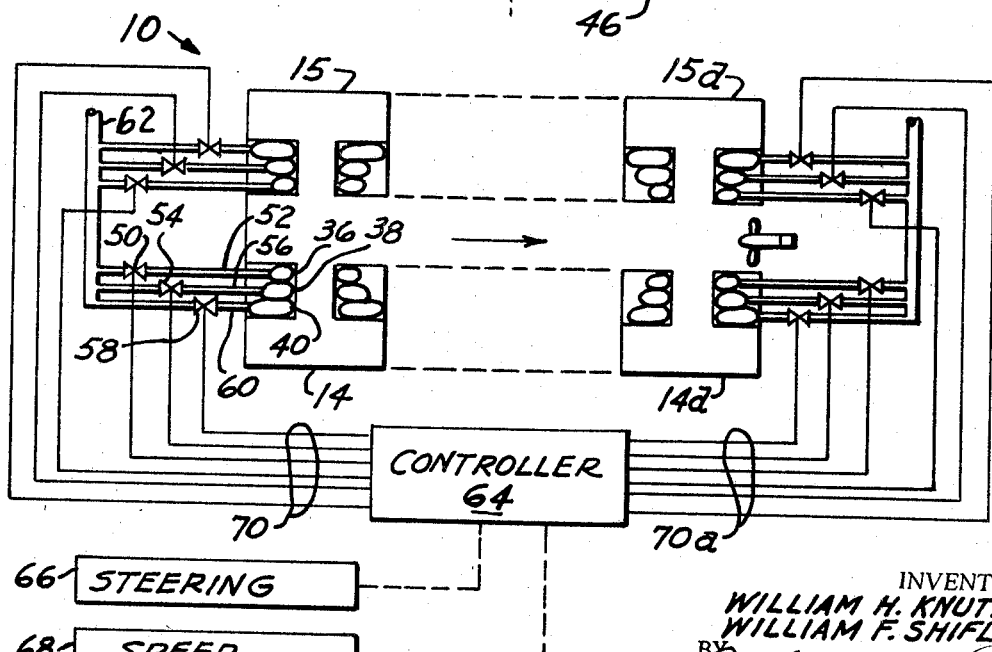
FIG. 3 is a schematic diagram of a control system for retracting and extending the cushion cells illustrated in FIG. 2.

The inflation of pneumatic bladders 36, 38 and 40 is effectuated by means of suitable control apparatus such as that illustrated in FIG. 3. FIG. 3 illustrates a schematic diagram of a control system for regulating the inflation of the pneumatic bladders. FIG. 3 diagrammatically illustrates cushion cells 14, 14d 15 and 15d, cells 14 and 14d being on the right side of the vehicle while cells 15 and 15d are on the left side of the vehicle. It is to be understood that any number of cushion cells may be utilized depending upon the particular design. Each cushion cell contains toroidal pneumatic bladders 36, 38 and 40 as hereinbefore described.

Referring particularly to cushion cell 14, pneumatic bladder 36 is connected to solenoid-operated valve 50 by means of conduit 52, pneumatic bladder 38 is connected to solenoid-operated valve 54 by means of conduit 56, and pneumatic bladder 40 is connected to solenoid-operated valve 58 by means of conduit 60. Each of valves 50, 54 and 58 is connected to a suitable source of pressurized fluid (not shown) by means of conduit 62. Controller 64 is provided and is mechanically linked to a suitable steering control 66 and speed control 68. By way of example, steering control 66 may be a suitable steering wheel while speed control 68 may be an accelerator pedal. Alternatively, the steering and speed controls may be incorporated as a single unit such as a control lever arm. As one example, a joystick similar to the type used in aircraft may be used. The output of controller 64 is electrically connected to each of the solenoid-operated valves by means of communication channels 70 and 70d. It is to be understood that separate communication channels are preferably utilized for each cushion cell 14–14d and 15–15d.

Speed control 68 is connected to a control mechanism (not shown) mounted to the vehicle and which drives the vehicle, for example, a propeller or a jet device. Steering control 66 is connected to a steering mechanism (not shown) mounted to the vehicle and which steers and maneuvers the vehicle.

In operation, if the operator desires to accelerate or decelerate the vehicle, speed control 68 is manually operated to operate the speed control mechanism (not shown) of the vehicle. At the same time, controller 64 operates selected ones of the solenoid valves to selectively extend and retract the skirts associated with each cushion cell. By way of example, during acceleration of the vehicle, controller 64 operates through channel 70 to act on each of the valves associated with the rearward cushion cells, namely cushion cells 14 and 15. The operation of the solenoids associated with the valves causes the valves to open, thereby inflating each of the pneumatic bladders with pressurized fluid from conduit 62. The inflation of the pneumatic bladders causes the skirt associated with the cushion cell to retract, thereby lowering the rearward end of the vehicle as hereinbefore described. If desired, some of the intermediate cushion cells between the forward and rearward cushion cells may be likewise controlled so as to selectively retract the skirts therein a lesser amount so that the skirts are successively of longer length along the length of the vehicle as illustrated in FIG. 1.

If the operator desires to change the direction of travel of the vehicle, he may operate steering control 66 to thereby operate suitable steering apparatus (not shown) to cause the desired maneuver. Operation of steering control 66 also operates controller 64 to selectively operate the solenoid valves associated with the cushion cells. By way of example, if it is desired to steer the vehicle to the left, operation of steering control 66 to the left will cause controller 64 to selectively operate solenoid valves associated with each of the cushion cells 15–15d. Operation of the solenoids associated with cushion cells 15 and 15d will cause inflation of the associated pneumatic bladders associated with cushion cells 15–15d to thereby retract the skirts associated with those cushion cells. By retracting the skirts associated with the left side cushion cells 15–15d, the vehicle may be banked to a degree desired for the maneuver. If desired, the amount of banking may also be dependent upon the speed as selected by speed control 68 to provide greater banking at high speeds than at low speeds.

If desired, controller 64 may be a gyro or rate gyro for stabilizing the vehicle by operating on the solenoid-operated valves. If such a gyro or rate gyro is used, it may operate independently of the steering and speed controls 66 and 68 to automatically adjust the elevation of the cushion cells in accordance with the performance of the vehicle.

The present invention thus provides retractable cushion cells for air cushion vehicles which are capable of being retracted and extended to stabilize the vehicle during maneuvering operations. The retraction and extension of the cushion cells operate to bank and pitch the vehicle while it is maneuvering. The retractable cushion cells are easily constructed and maintained. They provide sufficient stability for air cushion vehicles during maneuvering operations and particularly at relatively high velocities.

This invention is not to be limited by the embodiment shown in the drawings and described in the description, which is given by way of example and not of limitation.

What is claimed:

1. In a fluid cushion vehicle having a substantially rigid housing, the improvement comprising: a cushion cell secured to and depending from said housing and enclosing a cushion of pressurized fluid; orifice means supplying said pressurized fluid to said cushion cell; and pneumatic retraction means secured to said cell and disposed in said housing completely external of said cell and the enclosed cushion of pressurized fluid therein for selectively bodily extending and retracting said cushion cell and the cushion of pressurized fluid enclosed thereby.

2. In a fluid cushion vehicle according to claim 1 wherein said retraction means includes inflatable bladder means supported by said housing, and inflation means for selectively inflating and deflating said bladder means, said cushion cell being fixedly mounted to said housing and extending over one of said bladder means, whereby inflation of the bladder means retracts the cushion cell and deflation of the bladder means extends the cushion cell.

3. In a fluid cushion vehicle according to claim 2 wherein said cushion cell is substantially cylindrical and said bladder means comprises a plurality of substantially toroidal bladders.

4. In a fluid cushion vehicle according to claim 2 wherein there is a plurality of cushion cells each having respective bladder means.

5. In a fluid cushion vehicle according to claim 4 wherein said inflation means comprises a plurality of solenoid-operated valves, said valves being connected to respective ones of said bladder means, and selection means for selectively operating said solenoid-operated valves.

6. In a fluid cushion vehicle according to claim 5 wherein each cushion cell is substantially cylindrical and each bladder means comprises a plurality of substantially toroidal bladders.

7. A cushion cell for a fluid cushion vehicle having a substantially rigid housing, said cushion cell comprising: a flexible skirt secured to and depending from said housing and forming, together with said housing, a chamber enclosing a cushion of pressurized fluid; orifice means for supplying pressurized fluid to said chamber; and pneumatic retraction means secured to said skirt and disposed in said housing completely external of said cell and the enclosed cushion of pressurized fluid therein for selectively bodily extending and retracting said skirt and the cushion of pressurized fluid enclosed thereby.

8. Apparatus according to claim 7 wherein said retraction means includes inflatable bladder means supported by said housing, and inflation means for selectively inflating and deflating said bladder means, said skirt being fixedly mounted to said housing and extending over said bladder means, whereby inflation of said bladder means retracts said skirt and deflation of a bladder means extends said skirt.

9. Apparatus according to claim 8 wherein said skirt is substantially cylindrical and said bladder means comprises a plurality of substantially toroidal bladders.

10. Apparatus according to claim 8 wherein said inflation means comprises a solenoid-operated valve, said valve being connected to said bladder means, and selection means for selectively operating said solenoid-operated valve.

11. Apparatus according to claim 10 wherein said skirt is substantially cylindrical and said bladder means comprises a plurality of substantially toroidal bladders.

References Cited

UNITED STATES PATENTS

| | | | |
|---|---|---|---|
| 3,288,235 | 11/1966 | Jones | 180—128 X |
| 3,327,799 | 6/1967 | Guienne et al. | 180—124 |
| 3,371,738 | 3/1968 | Bertin | 180—127 |

A. HARRY LEVY, Primary Examiner

U.S. Cl. X.R.

180—127